Patented Nov. 22, 1938

2,137,890

UNITED STATES PATENT OFFICE 2,137,890

METHOD FOR TREATMENT AND DEHYDRATION OF FLESHY PLANT MATERIALS

Edwin F. Hopkins, Laurel, Miss.; dedicated to the free use of the People of the United States No Drawing. Application March 20, 1937,
Serial No. 132,101

5 Claims. (Cl. 99—204)

(Granted under the act of March 3, 1883, as amended April 30, 1928; 370 O. G. 757)

This application is made under the act of March 3, 1883, as amended by the act of April 30, 1928, and the invention, if patented, may be manufactured and used by or for the Government for governmental purposes without the payment to me of any royalty thereon.

I hereby dedicate the invention herein described to the free use of the people of the United States to take effect on the granting of a patent to me.

The preservation of fruits and vegetables is frequently accomplished by reducing their water content to a degree that spoilage will not take place. As ordinarily conducted, dehydrating fleshy plant materials is slow and frequently difficult due to the slow rate of diffusion of the water vapor from the plant sap contained in cells having semi-permeable walls. The invention to be described pertains to a process whereby it is possible, by very simple means, to increase the permeability of plant cell walls, thus allowing more rapid diffusion of water vapor when dehydrating by the usual methods, as well as more rapid and complete removal of solubles by the ordinary methods of diffusion, extraction or pressing. Biologically, fleshy plant material is a living thing and its life processes may continue for indefinite periods, but it always involves the consumption of stored material upon which the intrinsic value of the material is frequently based and is subject also to decomposition by the invasion of microorganisms.

To prevent losses of valuable constituents in plant materials as a result of respiration, metabolic changes and decomposition due to microorganisms, it is proposed to subject the plant material to either of the following processes of dehydration.

The material, such as roots, tubers, bulbs, stalk, leaves, fruits, nuts or any similar plant material, whole or sliced, is dipped in certain chemicals characterized at fat-solvents, such as carbon tetrachloride, chloroform, carbon bisulphide, petroleum ether, toluene, ether, benzol, gasoline or other organic liquids, such as aliphatic esters or solutions, which will make the plant cells permeable, and then removed and placed in a closed chamber at ordinary or slightly elevated temperature until the material has lost its turgidity and has become soft and flabby as a result of plasmolysis. The time for plasmolysis cannot be fixed as its rate is dependent upon the type of material, the degree of subdivision and the temperature, but it generally occurs within a few hours.

A second method whereby this reaction may also be made to take place is to expose the plant materials to vapors of these same chemicals in a closed chamber under similar conditions as regards time and temperature.

A third method whereby plasmolysis of plant material can be made to occur consists of exposing the material, in closed chambers, to such gases, or mixture of gases, as sulphur dioxide, or chlorine, pure or in admixture with air or inert gases, until the material has lost its turgidity and has become soft and flabby. The time required to produce the desired results with these gases, as with the organic solvents or their vapors, depends upon such factors as the concentration of the gas, temperature during exposure, the degree of subdivision and type of plant material being used, but will occur within a few hours.

More specifically these processes relate to the treatment of sweet-potatoes prior to the manufacture of starch, but it is understood that they are not limited thereto.

After the above treatment, the juice or cell sap containing the soluble constituents of the plant tissue is pressed out by any suitable means. In comparison with the residue from fresh turgid material, the pressed residue from the treated material, employing the same pressure, contains considerably less residual moisture. The amount of this residual moisture is dependent upon the pressure exerted, but there is no practical difficulty in reducing the moisture content of the residue to 40% or less. The reduction in weight of the original material by simple pressing after treatment ranges from 50 to 85%, depending upon the type of material being dehydrated, or the amount of water contained in the original material. The pressed residue is now either dried under ordinary atmospheric conditions or at a relatively low drying temperature to a moisture content of 10 to 15% in which condition it may be stored indefinitely without spoilage for future use as such or for the manufacture of food or industrial products, for example, starch from sweet or Irish potatoes treated in the manner described. The drying of the pressed residue is rapid since the plant cells are completely permeable and do not tend to retain water osmotically against the force of evaporation.

The juice or cell sap containing the soluble and suspended constituents (principally organic compounds such as sugars) is evaporated to a sirup, preferably under reduced pressure, to such a concentration (75 to 80% dry substance), or to a dried product that it may be stored indefinitely without spoilage for future use as such, or for the manufacture of food or industrial products, for example, the production of alcohol from sweet-potato solubles.

My process is unique in that it provides a method for the more rapid and satisfactory dehydration of fleshy plant materials in order that they may be stored for indefinite periods without loss from rotting, freezing, respiration, molding, enzyme action, etc., in comparison with the present processes. This is due to the complete permeability of the plant tissues after the chemical treatment so that the sap or juice may be easily pressed out and so that the water remaining in the pressed residue can be evaporated quickly at low temperatures. This results in a large saving of heat and, for some purposes, gives a superior product because oxidation is reduced and carmelization is largely prevented because of the removal of a large proportion of the sugars and other easily decomposable organic constituents. By deyhdrating such plant materials, they can be shipped at a very great saving in cost and without danger of losses due to decomposition.

My process is understood to include that of increasing the permeability of plant materials, without subsequent pressing, as in cases where it is desired to extract substances with water or other liquid, since the treatment will greatly increase the rate of diffusion over mere slicing. Thus, where soluble constituents are the principal products, the coat of removing them, in comparison to existing methods, is lowered whether extracted by pressing or by diffusion processes.

Having thus described my invention, I claim:

1. A process for treating fleshy plant materials, which comprises subjecting these materials to the action of a material selected from the group consisting of fat solvents, thereby permitting them to become plasmolyzed, and thence mechanically removing the water and water soluble constituents.

2. A process for treating fleshy plant materials, which comprises subjecting these materials to the action of carbon tetrachloride, thereby permitting them to become plasmolyzed, and thence mechanically removing the water and water soluble constituents.

3. A process for treating fleshy plant materials, which comprises subjecting them to the action of chlorine, thereby permitting them to become plasmolyzed, and thence mechanically removing the water and water soluble constituents.

4. A process for treating potatoes, which comprises subjecting them to the action of sulfur dioxide, thereby permitting them to become plasmolyzed, and thence mechanically removing the water and water soluble constituents.

5. A process for treating beets, which comprises subjecting them to the action of sulfur dioxide, thereby permitting them to become plasmolyzed and thence mechanically removing the water and water soluble constituents.

EDWIN F. HOPKINS.